United States Patent
Bregier

[11] Patent Number: 4,912,820
[45] Date of Patent: Apr. 3, 1990

[54] APPARATUS FOR STRETCHING A FILM OF PLASTIC MATERIAL

[75] Inventor: Michel Bregier, Paris, France
[73] Assignee: Rebichon Signode, Paris, France
[21] Appl. No.: 318,224
[22] Filed: Mar. 2, 1989
[30] Foreign Application Priority Data
Mar. 4, 1988 [FR] France ................ 88 02797
[51] Int. Cl.[4] ................ D06C 3/00
[52] U.S. Cl. ................ 26/71; 28/245
[58] Field of Search ................ 26/71; 28/240, 245
[56] References Cited
U.S. PATENT DOCUMENTS
3,500,519  3/1970  Stanley ................ 28/245
4,496,507  1/1985  Okita et al. ................ 28/245

FOREIGN PATENT DOCUMENTS
2126026 of 1972 Fed. Rep. of Germany ......... 26/71

Primary Examiner—Werner H. Schroeder
Assistant Examiner—Jodi A. Tokar
Attorney, Agent, or Firm—Griffin, Branigan & Butler

[57] ABSTRACT

A stretching apparatus in accordance with the invention has an upstream roll (2) and a downstream roll (6) which are driven with a given peripheral speed ratio, together with a plurality of intermediate rolls (8, 9) which are not motorized, but which are coupled to each other to rotate with a given peripheral speed ratio which is less than the speed ratio between the upstream and downstream rolls (2, 6).

6 Claims, 2 Drawing Sheets

1

APPARATUS FOR STRETCHING A FILM OF PLASTIC MATERIAL

The present invention relates to apparatus for stretching a film of plastic material taken from a reel.

BACKGROUND OF THE INVENTION

Films of plastic material are currently available on the market which are suitable for being stretched very greatly, thereby reducing their thickness, and to some extent reducing their width. One of the applications of such films lies in wrapping, and the main purpose of stretching is to save film. Although such stretching imparts a high degree of plastic deformation, the film nevertheless retains some residual elasticity which is made use of when wrapping a product.

In all currently known apparatuses, film is stretched lengthways on a continuous basis by using at least two rolls, with the film being wrapped around each of them over a sufficient contact area for friction between the film and each roll to prevent slipping, and then by rotating the rolls in such a manner as to obtain different peripheral speeds. In this way, the speed of the film at the outlet from the two rolls is greater than its speed at the inlet, thereby generating a longitudinal force in that portion of the film which lies between the two cylindrical rolls, and thus stretching the film. It will be understood that the ratio between these two peripheral speeds is equal to the stretching ratio, and that the film may be elongated by up to 300% in this way (that is to say its initial length multiplied by 4).

Numerous ways of implementing these fundamental means are known. One of the simplest consists in driving the downstream roll by a motor and in braking the upstream roll in order to slow it down by a quantity corresponding to the desired elongation. A second implementation consists in coupling the two rolls mechanically and in stretching a film where it passes between them. It is also possible to assist the passage of the film by motorizing one of the rolls and by controlling the operation of the motor as a function of various parameters.

When it is desired that all of the stretching should be obtained by using two rolls only, problems arise fairly quickly due to the fact that the film is subject to a high degree of stress which often gives rise to breakages, in particular when the nature or the dimensions of the film vary or when the ambient atmosphere varies. In order to obtain satisfactory operation, it becomes necessary to reduce the elongation ratio, thereby reducing the risks of breakage and thus of stopping the apparatus.

One solution to this problem lies in using numerous stretching stages, with the film passing over a plurality of successive rolls whose peripheral speeds increase in the direction of film travel. One of the drawbacks of such a succession of rolls lies in the bulk of the resulting apparatus. A second drawback lies in the fact that the elongation ratio in such apparatus is fixed for each stage and any variation in the characteristics of the film or in the ambient atmosphere, or any change in the nature of the film can only be taken into account either by dismantling the coupling mechanisms or else by providing speed-varying means in the transmissions between the rolls, with such means being provided by devices which are specially shaped and expensive. Finally, mention should be made of more or less complex variants of the basic principle in which the elongation ratio is varied by replacing one of the rolls in the apparatus by another roll having a different peripheral speed, or by changing the diameter of one of the rolls in order to vary its peripheral speed for constant speed of rotation.

None of these prior devices can solve problems due to any kind of variation in the stretching conditions during a stretching run. One such variation which is of considerable importance lies in the thickness of the film within a given reel or between consecutive reels not being constant, due to the manufacturing process whereby the stretchable film is itself made. Another important factor is the operating temperature of the apparatus.

It has also been observed that the frequency of film breakage is much higher while the stretching process is being started up than it is in normal operation, and also that it is higher at lower ambient temperatures. In this context, it should be mentioned that stretching operations associated with wrapping are often performed in warehouses from which products are shipped under ambient temperature conditions which vary considerably from season to season.

The present invention seeks to provide a solution to this problem by means of apparatus which is simple and robust and which enables the stretching process to be regulated automatically as a function of variations in the conditions under which it is performed. This regulation is obtained without using servo-control means, i.e. without using any means for detecting various parameters and for processing signals representative of such parameters, which means are generally constituted by fragile members with a high risk of breakdown.

SUMMARY OF THE INVENTION

The present invention provides apparatus for stretching a film of plastic material, the apparatus comprising a plurality of successive rolls with the film bearing over a sufficient area of each of them to prevent the film from sliding on any of them, said apparatus comprising an upstream roll and a downstream roll which are driven at different peripheral speeds to determine an elongation ratio for the film, together with a plurality of intermediate rolls disposed between said upstream roll and said downstream roll, said intermediate rolls being non-motorized and being mechanically coupled to one another with increasing peripheral speeds in the direction of film travel, with the ratio between the fastest and the slowest intermediate roll speeds corresponding to a determined intermediate elongation of the film which is less than the total elongation provided by the apparatus as above.

The means for providing rotary coupling between the intermediate rolls are preferably such that the elongation ratio of the film as it passes through the plurality of intermediate rolls lies between one sixth and one third of the total elongation.

It will be understood that the apparatus of the invention causes the film to be stretched over at least two different stages. Elongation is performed by the intermediate rolls at a given ratio, and further elongation occurs at which depend on the conditions encountered during the stretching process. Thus, this further elongation may be observed to take place solely between the upstream roll and the first intermediate roll. Under other circumstances it may occur solely between the last intermediate roll and the downstream roll. Finally, it can occur in part upstream from the intermediate rolls, and in part downstream therefrom, with the ratio of said parts being variable. These different locations are completely independent of the way in which the apparatus is run and they may change during a given stretching run. A first result is that film breakage is almost completely eliminated regardless of the conditions under which a stretching run is performed.

In a simple variant embodiment, the number of intermediate rolls is limited to two. It is then preferable for these rolls to be coupled together so that they rotate in the same direction, so that the film does not have to pass between them, thereby greatly simplifying the operation of threading film through the apparatus. In such a case, the upstream and downstream rolls should also turn in the same direction as each other, but preferably in the opposite direction to the intermediate rolls. However such change of direction is not essential, it merely has the advantage of simplifying construction by avoiding the need for an auxiliary film deflection roll in order to satisfy the requirements for the film to wind without sliding over the stretching rolls.

Naturally, the directions of rotation of the upstream, downstream, and intermediate rolls could be chosen so that each roll rotates in the opposite direction to the directions in which the adjacent rolls rotate (along the film path). In this case, the film will necessarily pass through the line of centers of two consecutive rolls.

Finally, it is advantageous to have the intermediate rolls carried by a moving frame (sliding or hinged) which moves relative to the support frame for the upstream and downstream rolls, thereby facilitating film threading. It is advantageous for the rolls to be as close to one another as possible in order to limit film shrinkage in the width direction as much as possible while the film is being stretched. By having two frames which are movable relative to each other this requirement can be satisfied during a stretching operation while nevertheless facilitating the threading other end of a film through the apparatus.

BRIEF DESCRIPTION OF THE DRAWINGS

Embodiments of the invention are described by way of example with reference to the accompanying drawings, in which.

DETAILED DESCRIPTION

Figure 1:
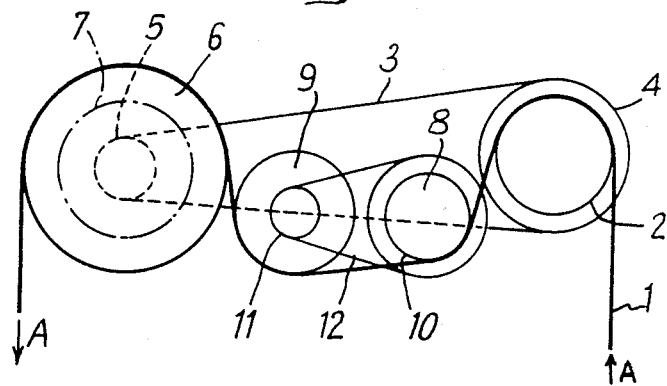
FIG. 1 is a diagrammatic plan view of a first embodiment of the invention.

In FIG. 1, a film 1 moves along arrow A, winds around a roll 2 called the upstream roll since it is the first roll encountered by the film 1 on its path, with said roll 2 being coupled in the example shown in the figure by means of a belt 3 and a pulley 4 to a pulley 5 on the shaft of a second roll 6. A motor 7 outlined in dot-dashed lines serves to drive the assembly coupled together in this way. Given the ratios selected between the diameters of the pulleys 4 and 5 and the diameters of the rolls 2 and 6, the peripheral speed of the roll 6 may be several times greater than the peripheral speed of the roll 2.

The film 1 leaves the roll 2 in order to make contact in succession with intermediate rolls 8 and 9. These two rolls are not motor driven, i.e. they rotate about their axes solely under drive from the film itself. However, they are mechanically coupled to each other by means of pulleys 10 and 11 and a belt 12 passing thereover. The diameters of the pulleys and the diameters of the intermediate are selected such that the peripheral speed of the downstream roll 9 is greater than the peripheral speed of roll 8. After leaving the roll 9, the film winds round film 6.

It is recalled that if the ratio between speeds of the rolls 6 and 2 is 4.5, then the film is elongated by 350%. The ratio between the peripheral speeds of the intermediate rolls 9 and 8 may be defined so as to obtain one-fifth of the total elongation between these two rolls, i.e. 70%. In this case the ratio is 1.7.

When the entire apparatus is driven by the motor 7 which drives the film via the rolls 2 and 3 and which provides the energy required for stretching it, several operating conditions can be observed. The first condition is that no elongation takes place between the rolls 2 and 8 with elongation being 70% between the rolls 8 and 9 and 280% between the rolls 9 and 6. Events take place as though the elongation between the intermediate rolls constitutes a priming stage necessary to achieving the main stretching, and perhaps thereby avoiding film breakage.

The second configuration corresponds to the case where 280% of the stretching takes place between the rolls 2 and 8, 70% between the rolls 8 and 9, and no elongation occurs between the rolls 9 and 6. Under these circumstances, it appears that the film is under conditions of temperature and thickness which allow it to be elongated by the normal amount without damage. The remaining 70% are then easily absorbed by the film, thereby enabling it to go beyond the usual stretching limits.

Finally, the third configuration is a medium term variation between the two extreme cases, with stretching being shared between the rolls 2 and 8, between the rolls 8 and 9 (at a fixed ratio), and then between the rolls 9 and 6. Equilibrium conditions have been observed with about 130% to 60% of the stretching occurring on either side of the intermediate rolls, with oscillations occurring about these middle values.

It has also been observed, that the apparatus passes easily during a single stretching run between various operating conditions, thereby automatically taking account of changes that may occur in the nature of the film or in ambient conditions.

Figure 2:
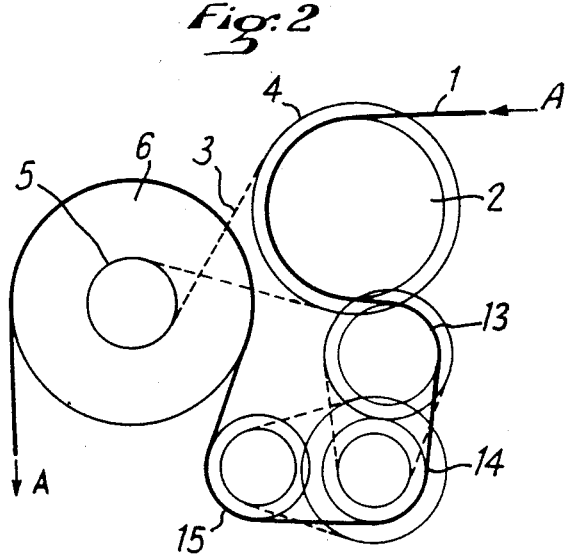
FIG. 2 is a diagrammatic plan view of a first variant embodiment.

There are numerous different ways in which apparatus in accordance with the invention can be built. FIG. 2 shows one possible example which includes three intermediate rolls 13, 14, and 15, thereby splitting the stretching performed by the intermediate rolls into two stages. If the intermediate rolls all rotate in the same direction and if there is an odd number of intermediate rolls, then the rolls 2 and 6 should be driven in opposite directions Naturally, the belt connections firstly between the upstream and downstream rolls, and secondly between the intermediate rolls, may be provided by other coupling means which may be fixed ratio means of variable ratio means. Similarly, the directions of rotation should be selected so as to provide a winding arc of film in each roll which is sufficient to ensure that the film adheres thereto without slipping. In this context, it may be observed that passing the film outside intermediate rolls which rotate in the same direction makes it easier to thread the film through the machine since there is no need to pass the film between any of these rolls. Finally, the distance between the rolls should be kept as short as possible so as to reduce the length of each elongation zone, thereby reducing the transverse shrinkage of the film. In this case, it is advantageous to mount the intermediate rolls on a frame which is movable relative to a frame which supports the upstream and downstream rolls.

Figure 3:
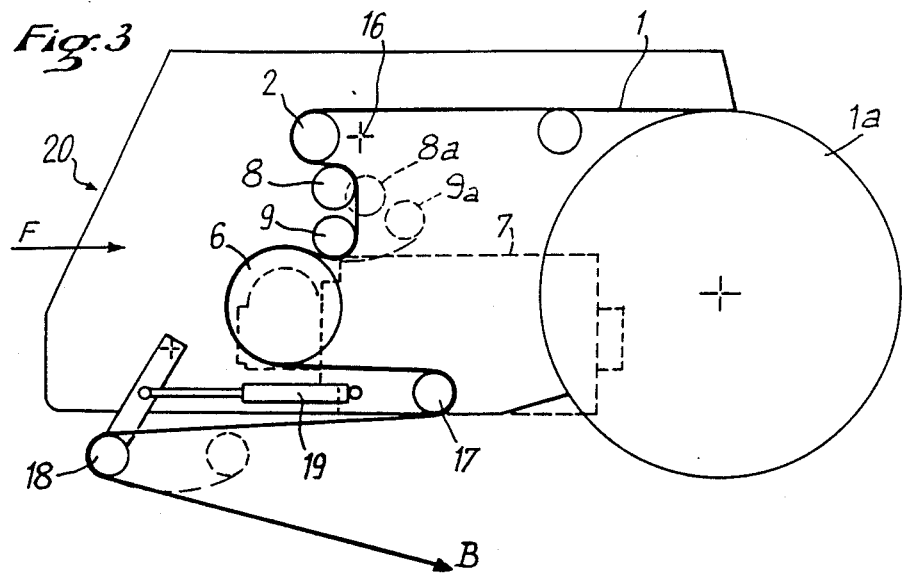
FIG. 3 is a diagram of a wrapping machine head fitted with apparatus as shown in FIG. 1.
Figure 4:
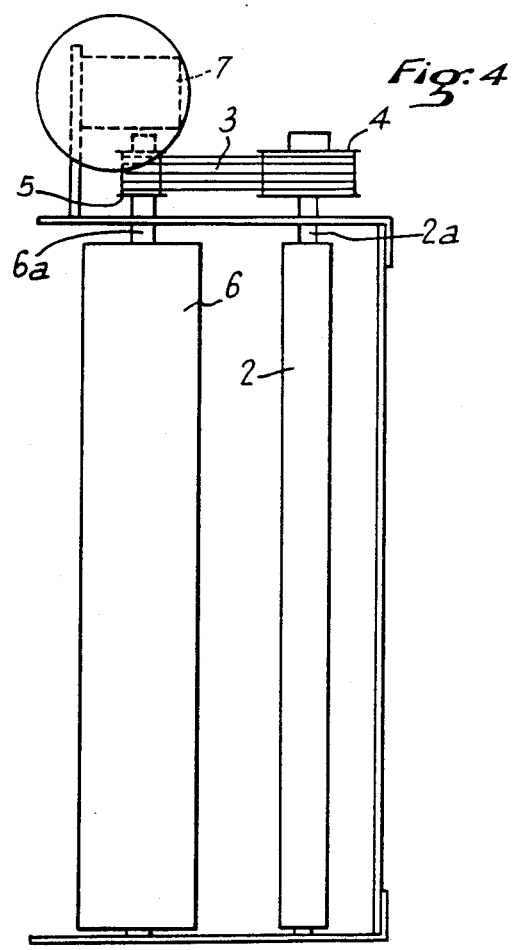
FIG. 4 is a fragmentary view in the direction of arrow F of FIG. 3.

In FIGS. 3 and 4, the apparatus of FIG. 1 is shown a being mounted on a head 20 for delivering stretched film in a direction B towards a load to be wrapped by having film wound around it. These figures show the film 1 being taken from a reel 1a and the above-described rolls which are given the same references. It can be seen that the rolls 8 and 9 can take up a position 8a, 9a by virtue of the chassis on which they are mounted (not shown) rotating about an axis 16. On leaving the roll 6, the film 1 passes over a deflector roll 17 and then over a roll 18 for keeping the film taut, with roll 18 cooperating with a spring 19 for absorbing in the quantity of film required by the load as it and assuming that the lead is polygonal in section The figures also show that the motor and stepdown gear 7 drives the shaft 6a of the roll 6 on which the pulley 5 mounted, with the belt 3 then driving the roll 2 via the pulley 4 which is fixed to the shaft 2a.

In a variant of the invention, the rolls 6 could be driven independently by means of independent motors whose speeds are servo-controlled to each other.

The apparatus of the invention may also for making reel of pre-stretched film on a workbench for such reels, after which the pre-stretched reels can merely be paid out in a winding head.

I claim:

1. Apparatus for stretching a film of plastic material, the apparatus comprising a plurality of successive rolls with the film bearing over a sufficient area of each of them to prevent the film from sliding on any of them, said apparatus comprising an upstream roll and a downstream roll which are driven at different peripheral speeds to determine an elongation ratio for the film, together with a plurality of intermediate rolls disposed between said upstream roll and said downstream roll, said intermediate rolls being non-motorized and being mechanically coupled to one another with increasing peripheral speeds in the direction of film travel, with the ratio between the fastest and the slowest intermediate roll speeds corresponding to a determined intermediate elongation of the film which is less than the total elongation provided by the apparatus as a whole.

2. Apparatus according to claim 1, characterized in that the elongation ratio of the film as it passes through the plurality of intermediate rolls lies between one-sixth and one-third of the total elongation.

3. Apparatus according to claim 1, wherein the intermediate rolls constitute a pair of rolls.

4. Apparatus according to claim 1, wherein the intermediate rolls all rotate in the same direction.

5. Apparatus according to claim 4, wherein the upstream and downstream rolls are mechanically coupled to each other, with a drive motor being coupled to the downstream roll in order to rotate said upstream and downstream rolls in the same direction which is opposite to the direction in which the intermediate rolls rotate.

6. Apparatus according to claim 1, wherein the intermediate rolls are carried by a frame which is pivotally mounted relative to a frame carrying the upstream and downstream rolls.

* * * * *